United States Patent [19]

Brett

[11] 4,324,286

[45] Apr. 13, 1982

[54] CONTROL FOR VEHICLE TEMPERATURE CONDITIONING SYSTEM

[75] Inventor: William C. Brett, Wetumpka, Ala.

[73] Assignee: The Trane Company, La Crosse, Wis.

[21] Appl. No.: 132,724

[22] Filed: Mar. 24, 1980

[51] Int. Cl.³ .......................... F25B 13/00; B60H 3/04
[52] U.S. Cl. ........................................... 165/2; 165/23;
165/28; 165/30; 165/43; 62/90; 62/133; 62/176 D
[58] Field of Search ........................ 165/23, 28, 30, 42,
165/43, 65, 2; 62/90, 133, 176 D, 241, 243, 244

[56] References Cited

U.S. PATENT DOCUMENTS

| | | | |
|---|---|---|---|
| 2,083,971 | 6/1937 | Winther | 62/117 |
| 2,193,838 | 3/1940 | Murphy et al. | 62/6 |
| 2,426,827 | 9/1947 | Hemming et al. | 165/30 |
| 2,460,135 | 1/1949 | Lehane et al. | 165/30 |
| 3,008,694 | 11/1961 | Todd | 165/42 |
| 3,351,129 | 11/1967 | Spatt | 165/30 |
| 4,135,368 | 1/1979 | Mohr et al. | 62/133 |

OTHER PUBLICATIONS

Bitterli et al., Energy Conservative Control of Terminal Reheat Heating, Ventilating and Air Conditioning System; 4-1979.

*Primary Examiner*—Albert W. Davis
*Assistant Examiner*—Margaret A. Focarino
*Attorney, Agent, or Firm*—Carl M. Lewis; Peter D. Ferguson; Ronald M. Anderson

[57] ABSTRACT

Apparatus and method for controlling a vehicular temperature conditioning system in response to temperature conditioning demand, outdoor ambient air temperature, discharge air temperature, and vehicle engine oil pressure which is indicative of the rotational speed of a clutch and shaft drivingly connecting the temperature conditioning system to the vehicle engine. A cooling mode is initiated if (1) the return air (comfort zone) temperature exceeds a predetermined maximum value, (2) the outside ambient air temperature exceeds a predetermined limit, and (3) the rotational speed of the clutch and drive shaft, as indicated by the vehicle engine oil pressure, is less than a predetermined limit. During operation in the cooling mode, a reheat cycle is initiated in response to the return air temperature and the discharge air temperature. The reheat cycle is terminated rapidly in response to the discharge air temperature, and being of relative short duration and repetitive in nature thereby minimizes temperature overshoot in the comfort zone, due to the thermal inertia of the heater.

16 Claims, 5 Drawing Figures

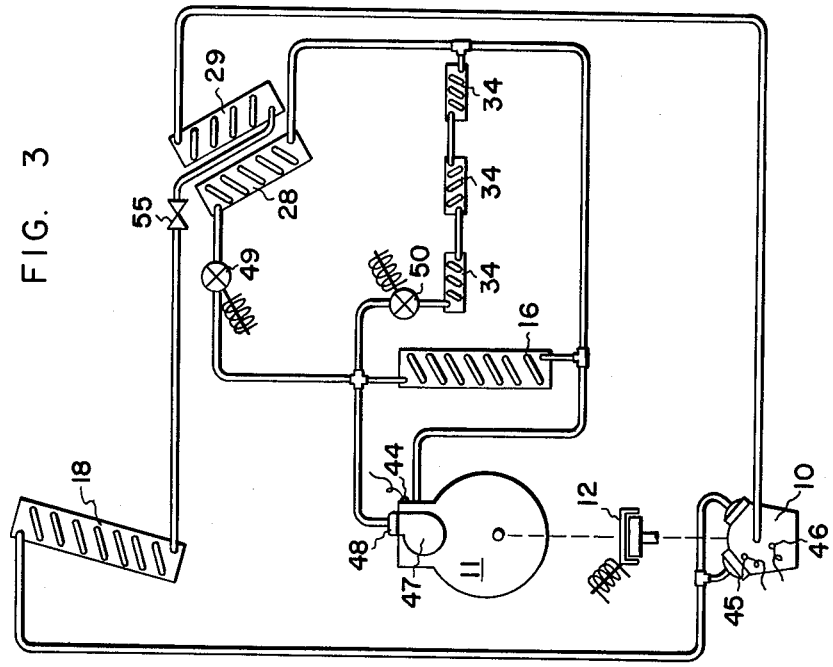
FIG. 3
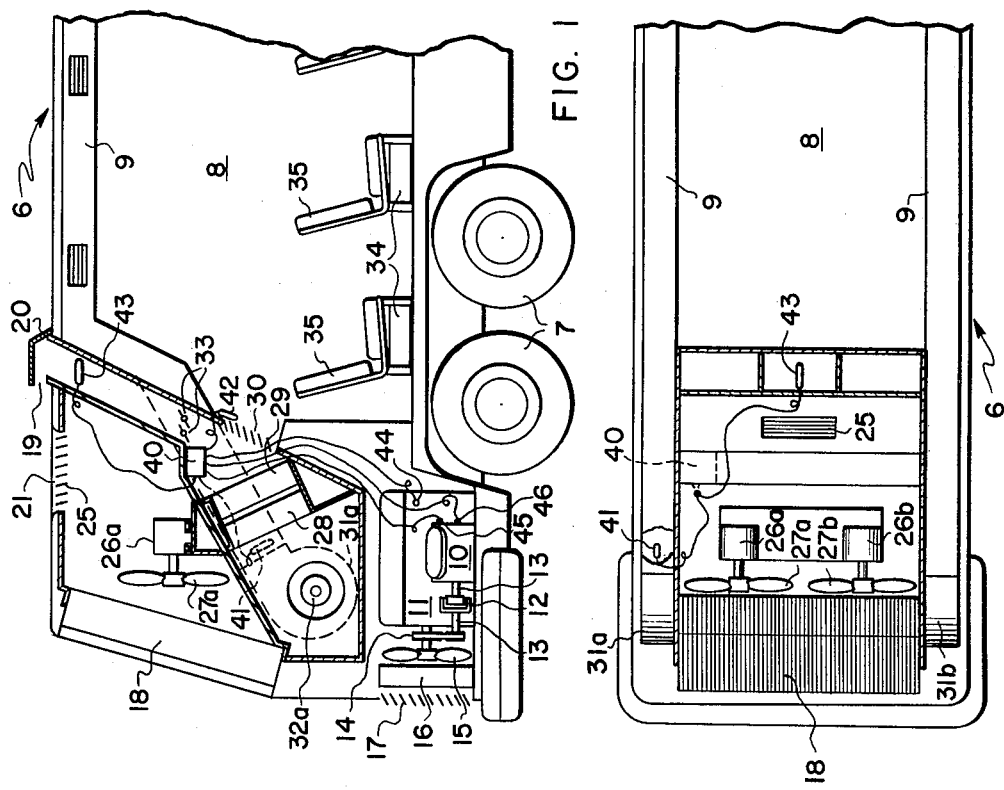
FIG. 1
FIG. 2

CONTROL FOR VEHICLE TEMPERATURE CONDITIONING SYSTEM

TECHNICAL FIELD

This invention generally involves apparatus and method for controlling a vehicular temperature conditioning system and specifically, apparatus and method for controlling initiation and termination of a reheat cycle while such a system is operating in a cooling mode.

BACKGROUND ART

Although the refrigerant compressor of a vehicular cooling system may be driven by an auxiliary engine or an electric motor, it is more common practice to drive the compressor with the same engine which provides motive power for the vehicle. The drive shaft of the compressor is typically coupled to the engine through an electrically actuated clutch. The clutch facilitates energizing the compressor when it is required for cooling the interior of the vehicle to maintain it at a comfort temperature.

Experience has shown that the compressor clutch may be subject to rapid wear, unless preventive measures are taken. For example, wear on the compressor clutch is reduced if it is energized only when the vehicle engine is at idle speed. Further reduction of clutch wear may be achieved by minimizing the frequency at which the clutch is engaged, i.e., by allowing the compressor to continue to run after the demand for cooling has been met. This reduces compressor cycling, thereby also extending the operating life of the compressor. Of course, once the interior of the vehicle is cooled to a setpoint temperature, continued cooling of the discharge air is undesirable unless it can be reheated before being discharged into the comfort zone of the vehicle. This is generally accomplished by circulating the air through a fluid-to-air heat exchanger, in heat transfer with the vehicle's engine coolant fluid. The same heat exchanger used for reheat is normally used to heat air discharged into the comfort zone during operation of the temperature conditioning system in a heating mode.

Because a vehicle is subjected to rapidly changing environmental conditions, a vehicular temperature conditioning system must respond quickly to changes in the temperature conditioning demand. Conventional controls for such systems are responsive to temperature sensors disposed either in the comfort zone or in the return air duct. As a result, it is not uncommon for the temperature in the comfort zone to fluctuate over a rather wide range, especially during operation in the cooling mode with reheat energized. This fluctuation results from inadequacies of the prior art controls in responding to temperature conditioning demand. Specifically, at termination of the reheat cycle, the reheat heat exchanger disposed in the chilled air stream continues to add heat to the cooled air after the reheat demand is met and after the control has stopped the flow of coolant fluid through the heat exchanger. It is the thermal inertia of the heater due to the hot coolant fluid trapped therein which causes the comfort zone temperature to overshoot. Prior art control systems, whether of the electrical type with "anticipation" means or of the pneumatic proportional type, therefore tend to allow the comfort zone temperature to fluctuate over too wide a range during the cooling cycle, because such controls terminate reheat in response to the return air (or comfort zone) temperature and do not adequately allow for the thermal inertia of the reheat heat exchanger.

Comfort zone temperature overshoot during the cooling mode is especially undesirable. It causes greater discomfort to passengers of the vehicle than does an equivalent overshoot occuring during the heating mode, for the following reason. The cooling mode is initiated when the vehicle is not radiating sufficient heat through its exterior surface nor sufficiently cooled by ventilation air flow to maintain the comfort zone at a setpoint temperature. After the setpoint temperature is attained, reheat is initiated to prevent overcooling of the comfort zone. When the setpoint temperature is exceeded due to reheat overshoot, the vehicle interior remains uncomfortably warm until the refrigerant cooling system reduces the temperature to the comfort level. By comparison, if the overshoot occurs during the heating mode, the windows and exterior surfaces of the vehicle tend to radiate the excess heat to the cold outside ambient air before the passengers become uncomfortably warm.

In consideration of the problems described above, it is an object of this invention to control a vehicular temperature conditioning system in a manner which minimizes reheat overshoot while the system is operating in the cooling mode.

It is further an object of this invention to provide method and control apparatus for such a system which reduces the deviation of the comfort zone temperature from a setpoint while operating in either a heating or cooling mode.

A still further object of this invention is to reduce the wear on a vehicular refrigerant vapor compressor and its associated clutch, while maintaining the comfort zone at a setpoint temperature.

These and other objects of the subject invention will become apparent from the drawings and the description which follows.

DISCLOSURE OF THE INVENTION

The subject invention is a control for a temperature conditioning system which includes a vapor compression air conditioner and heater for use in a vehicle. The control comprises a discharge air temperature sensor, a return air temperature sensor, and control means responsive thereto. If the return air temperature decreases to less than a predetermined maximum value, and the discharge air temperature decreases to less than a setpoint value, the control means are operative to activate the heater in a reheat mode to heat air cooled by the air conditioner. The reheat mode is terminated by the control means when the discharge temperature increases above the setpoint value, whereby temperature overshoot in the interior of the vehicle resulting from thermal inertia in the heater is minimized.

A rotating shaft and a clutch drivingly couple the air conditioner to the prime mover of the vehicle. The control further comprises means for sensing a condition indicative that the rotational speed of the clutch is less than a predetermined limit, and the control means are operative to energize the air conditioner by actuating the clutch only if the speed of the clutch is less than that limit, thereby preventing undue wear on the clutch and extending its useful life.

Methods for effecting the functions provided by the above-described control apparatus are a further aspect of this invention.

BRIEF DESCRIPTION OF THE DRAWINGS

FIG. 1 diagrammatically shows, in elevational aspect, the present invention as applied to temperature conditioning a motor coach.

FIG. 2 is a cutaway plan view showing a portion of the temperature conditioning apparatus in the motor coach.

FIG. 3 is a diagram illustrating the relationship of the motor coach engine cooling system, the temperature conditioning system, and the subject invention.

DESCRIPTION OF THE PREFERRED EMBODIMENT

Figure 5:
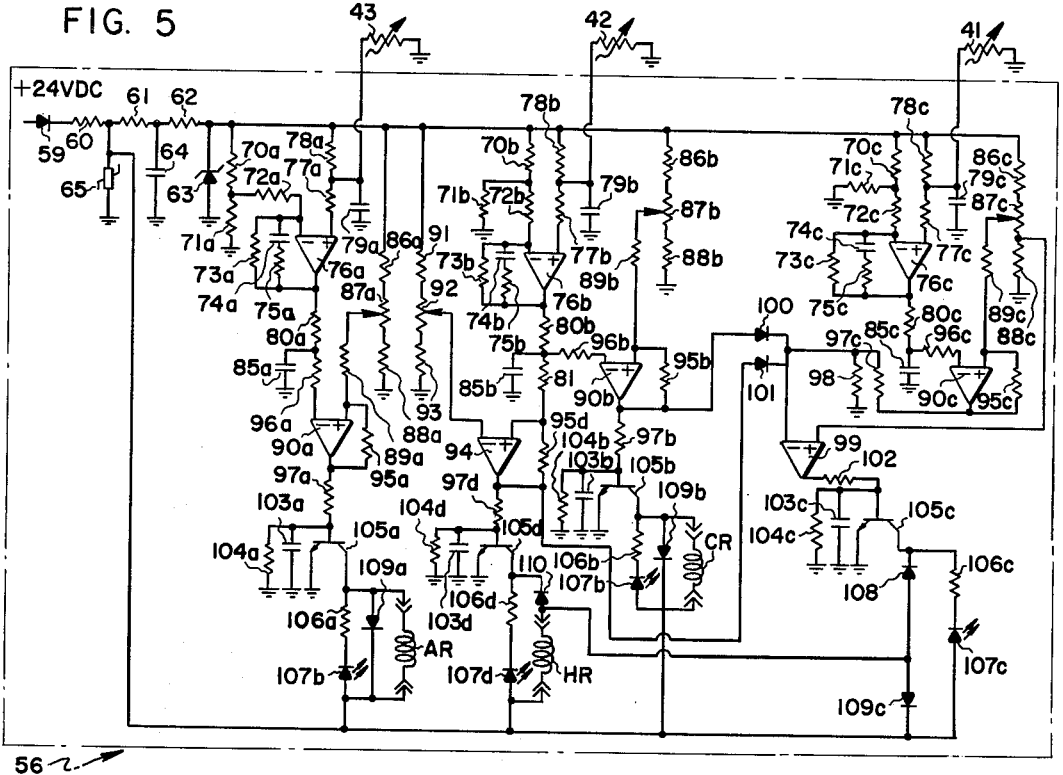
FIG. 5 is a detailed electrical schematic diagram of the solid-state circuit of the subject invention.

With reference to FIGS. 1 and 2, the relative disposition of a temperature conditioning system and the subject control therefor is shown in a cutaway view of the rear portion of the motor coach 6. The temperature conditioning system is located above and to the rear of the driven wheels 7, and supplies temperature conditioned air to the comfort zone 8 in the interior of the vehicle 6 through discharge air ducts 9 located near the top of each side of the motor vehicle. A refrigerant vapor compressor 10 is driven by the vehicle's prime mover, in this embodiment—diesel engine 11, by means of an electric clutch 12 and a drive shaft 13, which are coupled to the engine 11 by one or more rubber V-belts 14. The V-belts 14 run in pulleys mounted on the engine fan assembly 15 and the drive shaft 13. When engine 11 is running, the engine fan assembly 15 forces air through an engine coolant radiator 16 and a grille 17 disposed at the rear of the bus. Operation of the engine coolant system will be further described hereinbelow.

Located at the rear of the bus 6 in a position normally occupied by the rear window, is the refrigerant vapor condenser 18. Air flowing out through the condenser 18 enters through a fresh air inlet 21. Air flows through the inlet 21, through a condenser air grille 25, and thereafter through the condenser 18, exhausting to the rear of the motor coach 6. Condenser fan motors 26 and fan assemblies 27 are operative to move the air through the condenser 18 to cool the refrigerant vapor circulating therein. An engine coolant heat exchanger (or heater) 28 and the refrigerant vapor evaporator 29 are disposed immediately below the condenser fan motors 26. Air returning to the temperature conditioning means from the motor coach interior 8 flows through a return air inlet 30, and thereafter through the evaporator 29 and the heater 28, as suction is applied by blowers 31. Blowers 31 are disposed at each side of the motor coach 6, and are driven by blower motors 32. Fresh air flows through inlet 19, protected by weather cover 20, and is introduced to the return air circulated by blowers 31 through fresh air damper assembly 33. The proportion of fresh air introduced into the return air stream is controlled by the relative position of the fresh air damper assembly 33.

Floor heaters 34 are disposed beneath certain of the seats 35, to provide additional heat to the vehicle comfort zone 8. The floor heaters 34 include both heat exchangers and fans (not shown) for circulating air at floor level.

Disposed above the evaporator 29, are control means 40, which control the operation of the temperature conditioning apparatus described herein. The control means 40 are connected to discharge air temperature sensing means, thermistor 41; return air temperature sensing means, thermistor 42; outdoor ambient air temperature sensing means, thermistor 43; engine oil pressure sensor switch 44; refrigerant discharge pressure sensing switch 45; and refrigerant suction pressure sensing switch 46. The control means 40 are responsive to each of these devices 41 through 46, and are operative to control the system as will be explained hereinbelow.

Referring now to FIG. 3, the circulation of engine coolant for heating the comfort zone 8 is clearly illustrated. After thermostat valve 48 opens, engine coolant is circulated by water pump 47. If neither the heater solenoid valve 49 nor the floor heater solenoid valve 50 is open, engine coolant merely circulates through the engine radiator 16, where it is cooled by outdoor ambient air, and back through engine 11. During the heating mode, however, control means 40 cause the heater solenoid valve 49 and floor heater solenoid valve 50 to open, such that a portion of the water from water pump 47 circulates through heater 28 and through floor heaters 34, prior to returning to engine 11. Heater 28 and floor heaters 34 transfer engine heat to the air in the interior 8 of the motor coach 6. The floor heaters 34 are operative only if control means 40 has opened the valve 50 in response to an outdoor ambient air temperature less than a predetermined limit, 55° F.

During the cooling mode, the control means 40 energize the electric clutch 12, thereby causing engine 11 to drive the compressor 10. Refrigerant vapor compressed by compressor 10 flows through the condenser 18 where it is condensed into a liquid which passes through expansion valve 55 and into evaporator 29. Refrigerant liquid vaporizes in evaporator 29, thereby cooling air circulated into the comfort zone 8 of the motor coach 6. Refrigerant vapor thereafter recirculates through compressor 10 to repeat the cycle. When reheat is required during the cooling mode, control means 40 open heater solenoid valve 49, circulating hot engine coolant through the heater 28, thereby reheating the air cooled by the evaporator 29.

Figure 4:
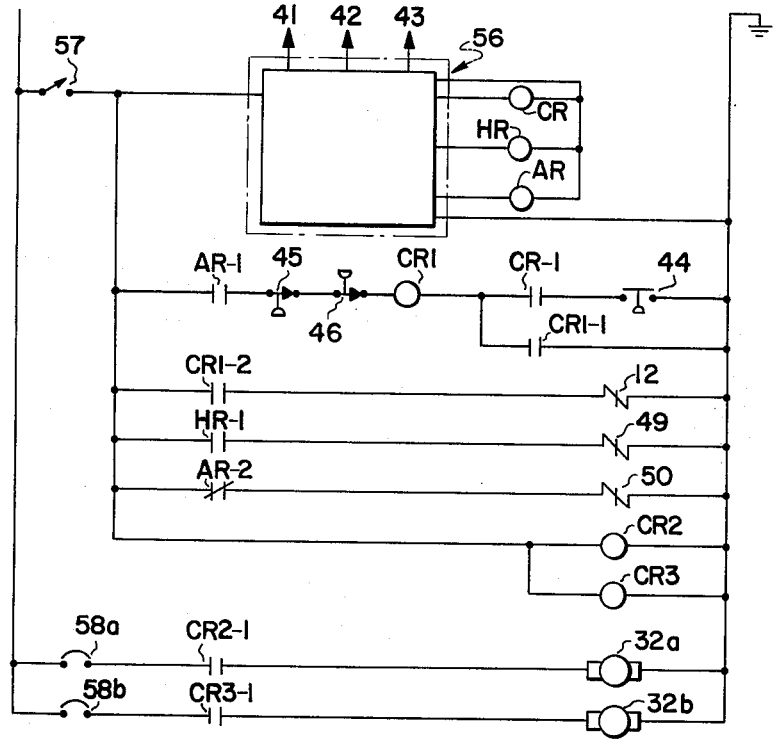
FIG. 4 is an electrical diagram illustrating the relay logic and control scheme of the subject invention.

The specific functions of the subject invention can best be understood by references to FIG. 4. The control means 40 comprise a solid-state circuit 56 with relay coils designated CR for cooling relay, HR for heating relay, and AR for ambient relay; and the associated relay circuit shown in FIG. 4. The temperature conditioning system is energized by closure of the master switch 57 which connects a DC power source of appropriate voltage (24 VDC in the preferred embodiment) to the solid-state circuit 45, to various relay contacts as will be described below, and to one side of relay coils CR2 and CR3. So long as relay coils CR2 and CR3 are energized, power is applied to blower motors 32a and 32b, through circuit breaker 58a and relay contact CR2-1, and circuit breaker 58b and relay contact CR3-1, respectively.

In the preferred embodiment, if the temperature of the return air as sensed by thermistor 42 is less than a predetermined minimum value, 68° F., the solid-state circuit 56 energizes the heating relay HR, closing relay contact HR-1. Power is thereby applied to energize the heater solenoid valve 49, causing hot engine coolant to circulate through the heater 28. Air circulated into the comfort zone 8 of the motor coach 6 is heated by the hot engine coolant, as described above. When the return air temperature exceeds 68° F., the solid-state circuit 56 de-energizes relay coil HR, opening contact HR-1, thereby de-energizing the heater solenoid valve 49. At this point, the heater 28 is filled with hot engine coolant and continues to add heat to the air passing through the heater coil. If the return air temperature again drops below 68° F., relay HR will again be energized, repeating the cycle. The floor heater solenoid valve 50 is enabled through the normally closed contact AR-2, so long as relay coil AR is not energized, i.e., at outdoor ambient air temperatures <55° F.

If the return air temperature is between 68° F. and 73° F., and if the compressor 10 is not energized, control means 40 are operative to circulate ventilating air into the comfort zone 8 of the motor coach 6. The air is neither heated nor cooled by the temperature conditioning system in this ventilation mode.

Should thermistor 43 sense an outdoor ambient air temperature above a predetermined limit, (55° F. in the preferred embodiment), and if the temperature within the bus, i.e., the return air temperature, is in excess of a predetermined maximum value, 73° F., the control means 40 energize the air conditioning compressor 10 to cool the comfort zone 8 of the motor coach 6. However, the control means 40 will energize the compressor 10 only if engine 11 is running at approximately an idle speed, thereby insuring that the electrical clutch 12 has a rotational speed less than a predetermined limit, and thus is not subjected to excessive wear which might cause its premature failure. Control means 40 determine that engine 11 is operating at idle speed in response to the relative engine oil pressure, as determined by sensor switch 44. If the engine oil pressure is less than a predetermined limit, sensor switch 44 closes, thereby completing the circuit for energizing relay coil CR1. Relay coil CR1 can only be energized if solid-state circuit 45 has energized the ambient relay AR in response to an outdoor ambient air temperature above 55° F., and has also energized the compressor relay CR, closing relay contacts CR-1, in response to a return air temperature in excess of 73° F. Relay coil CR1 is initially energized when contact CR-1 closes. However, relay CR1 closes contact CR-1, thereby completing the circuit independent of relay contact CR-1 and engine oil pressure switch 44. Relay coil CR1 also closes contact CR1-2, thereby energizing the electrical clutch 12 so that engine 11 can provide driving torque to compressor 10. Once electric clutch 12 is engaged, it remains engaged until the master switch 57 is placed in the "off" position, or until the outdoor ambient air temperature, determined by thermistor 43, falls below 55° F. Electric clutch 12 can also be de-energized by either the refrigerant suction pressure switch 46 or the refrigerant discharge pressure switch 45 due to too low and high pressure, respectively. This provides protection for the compressor in the event of system failure.

Should the return air temperature fall below the predetermined maximum value, 73° F., while relay coil CR1 is energized in a cooling mode, and if the discharge air temperature as sensed by thermistor 41 is less than the setpoint value, 63° F., control means 40 initiate a reheat cycle by energizing the heating relay HR. This closes relay contacts HR-1, thereby energizing the heater solenoid valve 49 and circulating hot engine coolant through the heater 28. As soon as the discharge air temperature exceeds 63° F., the solid-state circuit 56 opens relay contacts HR-1, stopping the flow of coolant through the heater 28 by closing the heater solenoid valve 49. In the preferred embodiment, the reheat cycle is controlled in response to a discharge air temperature setpoint value of 63° F., however, this value may change relative to changes in the design and size of the specific motor vehicle and temperature conditioning system to which the subject invention is applied. As discussed above, if the reheat cycle is controlled only in response to the temperature of the return air, overshoot will usually make the interior temperature of the vehicle uncomfortably warm to the occupants. However, the affect of the reheat cycle is apparent in the rise of discharge air temperature long before the return air temperature rises to its predetermined maximum value.

Because the discharge air temperature changes rapidly during the reheat cycle, the present invention results in the reheat cycle repeating several times as the return air temperature gradually rises to the predetermined maximum value (73° F. in the preferred embodiment). Each reheat cycle is terminated when the discharge air temperature exceeds 63° F.; except that if the return air temperature reaches 73° F. during any reheat cycle, that cycle will be terminated immediately, regardless of the discharge air temperature. The heater solenoid valve 49 is open for such a short time during each reheat cycle that only a relatively small volume of hot engine coolant flows into the heater 28. The repetitive short duration reheat cycles in affect modulate the flow of hot engine coolant through the heater 28. This invention thereby prevents a buildup of a large volume of very hot engine coolant in the heater 28 and thus minimizes temperature overshoot in the comfort zone 8 of the motor coach 6.

Turning now to FIG. 5, the schematic circuitry of the solid-state circuit 56 is disclosed in detail. In the preferred embodiment, the circuit is supplied with +24 volts DC through diode 59. Diode 59 insures that the correct voltage polarity is applied to the circuit components. Current from the voltage source is limited by resistor 60, such that if a voltage surge should be applied to the power supply input, the varistor 65 will protect the circuit by conducting a current limited by resistor 60, to ground. Resistors 61 and 62 and capacitor 64 are operative to filter the applied voltage and to further limit current to the zener diode 63. Zener diode 63 regulates the voltage on the low voltage bus to 8.2 volts DC.

As shown in FIG. 5, thermistors 43, 42, and 41 are inputs to sections of the solid-state circuit which are similar in structure, although in part using resistors which are not of the same resistance. Operation of these similar sections will be described in general, with references made to particular portions, as appropriate.

Resistors 70 are connected to the 8.2 volt DC bus, and in series with resistors 71 to ground, thereby operating as a voltage divider with its output connected to resistors 72. Resistors 73 are connected in parallel with the series connection of capacitors 74 and resistors 75, thereby comprising a feedback path around operational amplifiers 76. The operational amplifiers 74 are connected in inverting mode and are operative to amplify the difference voltage between resistors 72 connected to their inverting input and resistors 77 connected to their non-inverting input. Resistors 77 and 78 are connected in series to the 8.2 volt DC bus, their common junction in turn being connected to ground through their respective inputs, thermistors 43, 42, and 41. It will be apparent therefore that the voltage drop developed across thermistors 41 through 43 determines the voltage applied to the non-inverting input of the operational amplifiers 76. Since the resistance of thermistors 41 through 43 is inversely proportional to temperature, an increasing temperature will cause the voltage on the non-inverting input of operational amplifiers 76 to decrease relative to the reference voltage on the inverting input, resulting in a decreasing output voltage from operational amplifiers 76. The voltage gain of operational amplifier 76 is determined by the ratio of the feedback impedance to the input resistance of resistors 72. The capacitors 74 in series with resistors 75 provide a low impedance feedback path for rapid changes in the input voltage, with the result that such rapid changes create relatively little difference in the output voltage; however, resistors 73 are relatively high in resistance compared to resistors 75, (and input resistors 72) resulting in a relatively large change in the output voltage as the input voltage changes slowly. Capacitor 74 and resistors 75 thus minimize the effects of transients on the circuit. Capacitors 79 connect thermistors 41 through 43 to ground to filter out electrical noise which may be picked up the thermistor leads.

The outputs of operational amplifiers 76 are connected to one side of resistors 80; the other side of resistors 80 is connected through capacitors 85, to ground. Resistors 80 and capacitors 85 are operative to filter electrical noise which may be present on the output of the operational amplifiers 76.

An adjustable reference voltage is derived from the 8.2 volt DC bus by a voltage divider circuit comprising fixed resistors 86 in series with variable resistors 87 and fixed resistors 88, connected to ground. Variable resistor 87a is provided to set the predetermined limit for the temperature of the outdoor ambient air at which the cooling mode will be energized. In similar fashion, variable resistor 87b is used to set the temperature of the return air at which the cooling relay CR is energized, and variable resistor 87c is used to set the discharge air temperature at which the reheat cycle is initiated and terminated. The voltages which are determined by the setting of variable resistors 87 are input through resistors 89 to the non-inverting inputs of operational amplifiers 90.

Means for setting the temperature of the return air at which the heating mode is energized are provided by a voltage divider comprising fixed resistor 91, variable resistor 92 and fixed resistor 93 in series connection between the 8.2 volt DC bus and ground. Variable resistor 92 provides an adjustable reference voltage for the inverting input of operational amplifier 94. Resistor 81 connects the common connection of resistor 80b and capacitor 85b to the non-inverting input of operational amplifier 94. Operational amplifiers 90 and 94 are used as voltage comparators, wherein their output voltage approximately equals their supply voltage if the magnitude of the voltage applied to the non-inverting input exceeds the magnitude of the voltage applied to the inverting input. Otherwise, their output voltage is approximately 0 volts. Resistors 96 are connected to the inverting input of operational amplifiers 90 and to the common connection of capacitors 85 and resistors 80.

An additional operational amplifier 99 is connected through its non-inverting input to a reference voltage derived from the common connection of resistor 88c and variable resistor 87c.

The output voltages from operational amplifiers 90 and 94 are connected through output resistors 97 to transistor switching circuitry, described below. Resistor 97c is connected in a voltage divider network with resistor 98 to supply a bias voltage to the inverting input of operational amplifier 99. Also connected to the inverting input of operational amplifier 99 is the output voltage from operational amplifier 90b and 94, through diodes 100 and 101 respectively. Operational amplifier 99 compares the voltage on its non-inverting input with the voltage on its inverting input and produces an output voltage approximately equal to either the supply voltage or 0 volts, as explained above. That output voltage is supplied to transistor switching circuitry through resistor 102.

Capacitors 103 and resistors 104 are connected in parallel to ground to filter electrical noise which may be present on the voltage supplied to the base connections of transistors 105. Transistors 105 are switched to a saturated condition by the output voltage of operational amplifiers 90a, 90b, 94, and 99. When transistors 105 are thus switched to a conductive stage, they enable current from the 24 volt bus, to flow through resistors 106 and light emitting diodes (LED's) 107, which are connected to the collectors of transistors 105. The resistors 106 provide current limiting for the LED's 107 and the transistors 105. In parallel with the series connection of resistors 106 and light emitting diodes 107 are their respective relay coils AR, HR, and CR, and diodes 109. Diodes 109 conduct inductive current produced by the relay coils when transistors 105 are de-energized. The LED's 107 are provided in the circuit to visually show when each of the respective relays with which they are connected in parallel are energized by transistors 105. Since the heating relay HR may be energized both in response to a demand for heat in the heating mode, and in response to a demand for reheat in the cooling mode, diode 110 is provided in series with the heating relay HR, and diode 109 is provided in connection to the collector of transistor 105c, oriented such that they block current flow through the LED's 107c and 107d except at those times when each should appropriately be lighted to indicate that the system is operating in a heating mode, or that reheat is operational in the cooling mode.

Operation of the active components of the solid-state circuit board 56 will now be described, with regard to control of the relay coils CR, HR, and AR. The voltage developed by the return air temperature sensor thermistor 42, is amplified by operational amplifier 76b and that amplified voltage is compared to a setpoint reference voltage developed at variable resistor 92. In the preferred embodiment, this voltage is functionally equivalent to a return air temperature of 68° F. Operational amplifier 94 makes this voltage comparison and produces an output voltage which switches transistor 105d to a conductive state if the return air temperature is less than 68°. When transistor 105d conducts, LED 107d visually indicates that the relay coil HR is energized. Once relay coil HR is energized in response to a return air temperature <68° F., the temperature conditioning system operates in the heating mode wherein air in the comfort zone 8 of the motor coach 6 is heated by the engine coolant fluid. Should the temperature in the comfort zone 8 of the motor coach 6 increase so that it exceeds 68°, the voltage on the non-inverting input of operational amplifier 94 will decrease to a point below the hysteresis level established by feedback resistor 95d, thereby switching off transistor 105d, stopping the current flow through LED 107d and heating relay HR.

The voltage proportional to the return air temperature, as amplified by operational amplifier 76b, is also applied to the inverting input of operational amplifier 90b. It should be clear that the output voltage from operational amplifier 90b will be low (or approximately equal to 0 volts) until the voltage applied to its non-inverting input from variable resistor 87b exceeds the voltage applied to its inverting input from operational amplifier 76b. In the preferred embodiment, variable resistor 87b is set so that operational amplifier 90b will have a high output voltage when the return air temperature exceeds 73° F. At that time, the output of operational amplifier 90b will switch transistor 105b to a conductive state thereby causing LED 107b to visually indicate that relay coil CR is energized. However, as FIG. 4 shows, before the cooling mode can be initiated, it is also necessary that the ambient relay AR be energized. Operational amplifier 75a amplifies the voltage produced by thermistor 43 in response to the outdoor ambient air temperature. That voltage is applied to the inverting input of operational amplifier 90a and compared to a reference voltage derived by the setting of variable resistor 87a, equivalent to a temperature of 55° F. As the outdoor ambient air temperature changes, the output voltage from amplifier 75a to the inverting input of operational amplifier 90a changes in inverse proportion. As soon as the outdoor ambient air temperature exceeds 55° F., operational amplifier 90a causes transistor 105a to conduct heavily, thereby lighting LED 107b and energizing ambient relay AR.

Recalling that the control means 40 uses relay CR1 and contact CR1-1 to latch the temperature conditioning system in the cooling mode once the cooling relay CR has been energized, it should be clear that the compressor 10 will remain operative even if the return air temperature falls below 73° and operational amplifier 90b switches off transistor 105b, thereby de-energizing cooling relay CR. The cooling mode will remain in operation until either the ambient relay AR is de-energized, pressure switches 45 or 46 open, or master switch 57 is opened.

During the cooling mode and after relay CR is de-energized, the discharge air temperature will eventually drop to the setpoint at which the reheat cycle should be initiated (63° in the preferred embodiment). Thermistor 41 senses the discharge air temperature, and develops a voltage inversely proportional thereto. This signal is amplified by operational amplifier 76c and is applied to the inverting input of operational amplifier 90c. Operational amplifier 90c compares the voltage developed at variable resistor 87c, equivalent to the 63° F. setpoint, to the voltage amplified by operational amplifier 76c and applied to the inverting input of operational amplifier 90c. As soon as that voltage exceeds the setpoint voltage on its non-inverting input, its output voltage goes low (approximately 0 volts). Operational amplifier 99 will have a low output voltage so long as the voltage applied to its inverting input exceeds the reference voltage developed at the common point between resistor 88c and variable resistor 87c. When the voltage applied to the inverting input of operational amplifier 99 is lower, its output voltage is high, and transistor 105c is switched to a conductive state, energizing LED 107c and heating relay HR through diode 108. Thus, the reheat cycle is initiated in response to the discharge air sensor, thermistor 41.

The reheat cycle typically repeats several times, being terminated when the temperature of the discharge air exceeds the 63° setpoint. When the return air temperature finally rises to 73° F., the output voltage of operational amplifier 90b, which is connected to the inverting input of operational amplifier 99 through diode 100, causes a low output voltage from operational amplifier 99, turning off transistor 105c and de-energizing the heating relay HR. It should be noted that if the temperature conditioning system is in the heating mode, such that the heating relay HR has been energized in response to the output from operational amplifier 94, that output will also be applied to the inverting input of operational amplifier 99 through diode 101, thereby switching transistor 105c to a nonconductive state and preventing LED 107c from improperly indicating that the temperature conditioning system is in the reheat mode.

A list of the active components used in solid-state circuit 56 of the preferred embodiment is shown in the following Table.

| COMPONENT | TYPE |
| --- | --- |
| Diodes 59, 100, 101, 108 109, and 110 | IN4003 |
| Varistor 64 | 68ZA2 |
| Zener Diode 63 | IN4738 |
| Operational Amp. 76, 90, 94, and 99 | LM324N (Quad Op. Amp.)* |
| Transistors 106 | MPSA06 |

*Although not shown in FIG. 5, each of the two quad operational amplifier chips is connected to the +8.2 VDC power supply bus and ground, as required.

While the present invention has been described with respect to a preferred embodiment, it is to be understood that modifications thereto will become apparent to those skilled in the art, which modifications lie within the scope of the present invention, as defined in the claims which follow.

I claim:

1. A control for a temperature conditioning system including a vapor compression air conditioner and a heater for use in a vehicle, said control comprising:
    (a) a discharge air temperature sensor, disposed downstream of the heater, for sensing the temperature of air discharged from the system into the interior of the vehicle;
    (b) means for sensing the temperature conditioning demand in the interior of the vehicle; and
    (c) control means responsive to the discharge air temperature sensor and to the temperature conditioning demand sensing means, and operative to activate the heater in a reheat mode to heat air cooled by the air conditioner, said reheat mode being activated in response to the temperature conditioning demand; and further operative to de-activate the heater to terminate the reheat mode if the discharge air temperature increases above a setpoint value, whereby the temperature conditioning demand in the interior of the vehicle is satisfied without excessive reheat overshoot resulting from the thermal inertia of the heater.

2. A control for a temperature conditioning system including a vapor compression air conditioner and a heater for use in a vehicle, said control comprising
    (a) a discharge air temperature sensor, disposed downstream of the heater, for sensing the temperature of air discharged from the system into the interior of the vehicle;

(b) a return air temperature sensor; and (c) control means responsive to the discharge air temperature sensor and return air temperature sensor and operative to activate the heater in a reheat mode to heat air cooled by the air conditioner, if the return air temperature decreases to less than a predetermined value and the discharge air temperature decreases to less than a setpoint value; and further operative to de-activate the heater to terminate the reheat mode when the discharge temperature increases above the setpoint value, whereby temperature overshoot in the interior of the vehicle resulting from thermal inertia of the heater is minimized.

3. A control for a system in which a vapor compression air conditioner and a heater are used to temperature condition air circulated through the interior of a vehicle, said control comprising (a) an outside ambient air temperature sensor;

(b) a discharge air temperature sensor, disposed downstream of the heater, for sensing the temperature of air discharged from the system into the interior of the vehicle;

(c) a return air temperature sensor; and (d) control means, responsive to the outside ambient, discharge, and return air temperature sensors and operative to energize the vapor compression air conditioner to cool the air circulated through the interior of the vehicle, if both (i) the return air temperature exceeds a predetermined maximum value, and (ii) the outside ambient air temperature exceeds a predetermined limit; and thereafter, while the air conditioner is in operation, the control means are further operative to activate the heater to reheat the cooled air; if both (a) the return air temperature decreases to less than the predetermined maximum value and (b) the discharge air temperature is less than a setpoint value; and to de-activate the heater; when the discharge temperature exceeds the setpoint value.

4. The control of claim 3 wherein the vehicle includes a prime mover cooled by a fluid, and wherein the heater includes a heat exchanger for transferring heat from the fluid to the air circulated through the interior of the vehicle.

5. The control of claim 4 wherein the heater includes a solenoid valve connected to the control means and operated thereby to activate or de-activate the flow of fluid through the heat exchanger, and wherein the control means are operative to repetitively activate and de-activate the flow of fluid through the heat exchanger in reheat cycles of relatively short duration, in response to the discharge air temperature and to terminate the reheat cycles in response to the return air temperature exceeding the predetermined maximum value in order to minimize the temperature overshoot in the vehicle interior resulting from the heat retained in the heat exchanger after the flow of fluid therethrough is stopped.

6. The control of claim 4 wherein the prime mover is drivingly coupled to the air conditioner through a rotating shaft and a clutch.

7. The control of claim 6 further comprising means for sensing a condition indicative that the rotational speed of the clutch is less than a predetermined limit, and wherein the control means are responsive to said condition sensing means and are further operative to energize the air conditioner by actuating the clutch only if the rotational speed of the clutch is less than the predetermined limit, thereby preventing undue wear on the clutch and extending its useful life.

8. The control of claim 4 wherein the control means are further operative to energize the heater by activating the flow of fluid through the heat exchanger when the air conditioner is not in operation, if the return air temperature is less than a predetermined minimum value; and to de-activate the flow of fluid through the heat exchanger if the return air temperature exceeds the predetermined minimum value.

9. The control of claim 7 wherein the control means are operative to de-energize the air conditioner to terminate cooling by disengaging the clutch if the outside ambient air temperature decreases until it is less than the predetermined limit.

10. A method for controlling a temperature conditioning system including a vapor compression air conditioner and a heater for use in a vehicle, said method comprising the steps of (a) sensing the temperature of air discharged from the system into the interior of the vehicle, at a point downstream of the heater;

(b) sensing the temperature conditioning demand in the interior of the vehicle; and (c) activating the heater in a reheat mode to heat air cooled by the air conditioner, said reheat mode being activated in response to the temperature conditioning demand; and further, de-activating the heater to terminate the reheat mode if the discharge air temperature increases above a setpoint value, whereby the temperature conditioning demand in the interior of the vehicle is satisfied without excessive reheat overshoot resulting from the thermal inertia of the heater.

11. A method for controlling a temperature conditioning sytem including a vapor compression air conditioner and a heater for use in a vehicle, said method comprising the steps of:

(a) sensing the temperature of air discharged from the system into the interior of the vehicle, at a point downstream of the heater;

(b) sensing the return air temperature; and (c) activating the heater in a reheat mode to heat air cooled by the air conditioner, if the return air temperature decreases to less than a predetermined value and the discharge air temperature decreases to less than a setpoint value; and further, de-activating the heater to terminate the reheat mode when the discharge temperature increases above the setpoint value, whereby temperature overshoot in the interior of the vehicle resulting from thermal inertia of the heater is minimized.

12. A method for controlling a system in which a vapor compression air conditioner and a heater are used to temperature condition air circulated through the interior of a vehicle, said method comprising the steps of (a) sensing the outside ambient air temperature;

(b) sensing the temperature of air discharged from the system into the interior of the vehicle, at a point downstream of the heater;

(c) sensing the return air temperature; and (d) energizing the vapor compression air conditioner to cool the air circulated through the interior of the vehicle, if both
  (i) the return air temperature exceeds a predetermined maximum value, and
  (ii) the outside ambient air temperature exceeds a predetermined limit; and thereafter, while the air conditioner is in operation, activating the heater to reheat the cooled air, if both
    (a) the return air temperature decreases to less than the predetermined maximum value, and
    (b) the discharge air temperature is less than a setpoint value;

and de-activating the heater, if the discharge temperature increases to exceed the setpoint value.

13. The method of claim 12 wherein the vehicle includes a prime mover cooled by a fluid circulated through a heat exchanger in the heater, said method further comprising the steps of activating or de-activating the flow of fluid through the heat exchanger to control the reheat of air circulated through the vehicle, and repetitively activating and de-activating the flow of fluid through the heat exchanger in reheat cycles of relatively short duration in response to the discharge air temperature and terminating the reheat cycles in response to the return air temperature exceeding the predetermined maximum value, thereby minimizing the temperature overshoot in the vehicle interior resulting from the heat retained in the heat exchanger after the flow of fluid therethrough is de-activated.

14. The method of claim 13 wherein the prime mover is drivingly coupled to the air conditioner through a rotating shaft and a clutch, said method further comprising the steps of sensing a condition indicative that the rotational speed of the clutch is less than a predetermined limit, and energizing the air conditioner by actuating the clutch only if the rotational speed of the clutch is less than the predetermined limit, thereby preventing undue wear on the clutch and extending its useful life.

15. The method of claim 13 further comprising the steps of energizing the heater by activating the flow of fluid through the heat exchanger when the air conditioner is not in operation, if the return air temperature is less than a predetermined minimum value; and de-activating the flow of fluid through the heat exchanger if the return air temperature exceeds the predetermined minimum value.

16. The method of claim 14 further comprising the step of de-energizing the air conditioner to terminate cooling by disengaging the clutch if the outside ambient air temperature decreases until it is less than the predetermined limit.

* * * * *